United States Patent
Barbieri et al.

(10) Patent No.: US 9,033,275 B2
(45) Date of Patent: May 19, 2015

(54) AIRCRAFT UNDERCARRIAGE

(75) Inventors: André Barbieri, Sausset les Pins (FR); Bruno Cacciaguerra, Aix en Provence (FR)

(73) Assignee: Airbus Helicopters, Marignane Cedex (FR)

(*) Notice: Subject to any disclaimer, the term of this patent is extended or adjusted under 35 U.S.C. 154(b) by 195 days.

(21) Appl. No.: 13/240,817

(22) Filed: Sep. 22, 2011

(65) Prior Publication Data
US 2012/0080558 A1    Apr. 5, 2012

(30) Foreign Application Priority Data
Oct. 4, 2010  (FR) ...................... 10 03922

(51) Int. Cl.
| | |
|---|---|
| *B64C 25/18* | (2006.01) |
| *B64C 25/00* | (2006.01) |
| *B64C 25/14* | (2006.01) |
| *B64C 25/12* | (2006.01) |
| *B64C 25/32* | (2006.01) |

(52) U.S. Cl.
CPC ................. *B64C 25/00* (2013.01); *B64C 25/14* (2013.01); *B64C 2025/125* (2013.01); *B64C 2025/325* (2013.01)

(58) Field of Classification Search
CPC .. B64C 25/18; B64C 25/58; B64C 2025/325; B64C 25/10; B64C 25/14; B64C 25/00; F16F 7/125
USPC ........... 244/102 A, 102 R, 103 R, 104 R, 107
See application file for complete search history.

(56) References Cited

U.S. PATENT DOCUMENTS

| | | | |
|---|---|---|---|
| 4,228,975 A * | 10/1980 | Sealey | ...................... 244/102 R |
| 4,537,374 A * | 8/1985 | Barnoin et al. | ........... 244/102 R |
| 4,821,983 A | 4/1989 | Aubry | |
| 5,337,976 A | 8/1994 | Derrien | |
| 7,407,134 B2 | 8/2008 | Bietenhader | |
| 7,429,019 B1 | 9/2008 | Bietenhader | |
| 2007/0057117 A1 | 3/2007 | Payen | |

(Continued)

FOREIGN PATENT DOCUMENTS

| | | |
|---|---|---|
| EP | 0275735 A1 | 7/1988 |
| EP | 1714870 A1 | 10/2006 |
| EP | 1721827 A1 | 11/2006 |

(Continued)

OTHER PUBLICATIONS

Search Report and Written Opinion; Application No. FR 1003922; dated May 13, 2011.

*Primary Examiner* — Tien Dinh
*Assistant Examiner* — Vicente Rodriguez
(74) *Attorney, Agent, or Firm* — Brooks Kushman P.C.

(57) ABSTRACT

An undercarriage (6) provided with an undercarriage leg (10) and a shock absorber (20), said undercarriage (6) including an actuator-shock absorber (30), said undercarriage leg (10) comprising both a first element (11) carrying contact means (13) and a second element (12), which elements are hinged to each other. The undercarriage (6) includes pivot means (40) enabling said undercarriage leg (10) to pivot firstly in a first direction (S1) in order to retract said undercarriage leg (10) into said housing (4) under drive from said actuator-shock absorber (30), and secondly, during an emergency landing, in a second direction (S2) opposite to the first direction (S1) in order to move said undercarriage leg (10) away from said housing (4) while stressing said actuator-shock absorber (30).

20 Claims, 3 Drawing Sheets

(56) References Cited

U.S. PATENT DOCUMENTS

2007/0095976 A1 5/2007 Bietenhader
2008/0237396 A1 10/2008 Bietenhader

FOREIGN PATENT DOCUMENTS

FR 2383070 A1 10/1978
FR 2689087 A1 10/1993

* cited by examiner

Fig.12 ized function in the event of an emergency landing, the undercarriage being remarkable in particular in that the actuator-shock absorber is hinged to the undercarriage leg and to the aircraft, said actuator-shock absorber extending longitudinally along a direction of extension, the actuator-shock absorber being hinged to the aircraft via first hinge means having a first pivot axis that is substantially parallel to the direction of extension so as to enable the actuator-shock absorber to pivot, during an emergency landing, in order to limit the risk of the actuator-shock absorber penetrating into the aircraft.

AIRCRAFT UNDERCARRIAGE

CROSS REFERENCE TO RELATED APPLICATIONS

This application claims priority to French Patent Application No. FR 10 03922 filed Oct. 4, 2010, the disclosure of which is incorporated in its entirety by reference herein.

BACKGROUND OF THE INVENTION (1) Field of the Invention

The present invention relates to an undercarriage, to an aircraft having at least one retractable undercarriage, in particular a rotorcraft of the helicopter type, and to a method of landing said aircraft.

(2) Description of Related Art

Conventionally, an aircraft includes landing gear having a plurality of undercarriages.

In order at least to minimize aerodynamic drag of an undercarriage during cruising flight, so as to obtain an aircraft capable of flying at high speed or over a long distance, it is known to retract the undercarriages into suitable housings.

Two alternative installations can then be distinguished.

In a first type of installation, a streamlined fairing is used, sometimes known as a "sponson" by the person skilled in the art, with the undercarriage then being retracted in flight into the housing as defined in particular by the streamlined fairing.

Although advantageous, that first type of installation presents the drawback of requiring projecting fairings that generate non-negligible aerodynamic drag. The saving in drag that is achieved by retracting the undercarriage in cruising flight is thus diminished by the aerodynamic drag due to the fairings covering the landing gear.

In a second type of installation, the landing gear is arranged in a landing-gear well, i.e. a housing that is arranged in the airframe of the aircraft. The well may be closed by a movable hatch suitable for reconstituting the skin of the aircraft locally.

That second type of installation thus does not generate any additional aerodynamic drag in flight. Nevertheless it presents the drawback of requiring large housings that are found to be penalizing in terms of weight. Furthermore, it is sometimes difficult to obtain the necessary volume inside the airframe.

In addition, a portion of the undercarriage is sometimes located between load-carrying frames for a cabin of the aircraft, and this location can constitute a source of noise and indeed can lead to elements of the undercarriage intruding into the cabin in the event of an accident.

An undercarriage is sometimes designed not only to absorb the energy that results from a normal landing, but also to absorb the energy that results from an emergency landing, in other words during a crash of the aircraft under emergency conditions as specified in certification regulations, for example.

The undercarriage then includes an undercarriage leg supporting contact means, e.g. a wheel, and it may also include an actuator-shock absorber. The actuator-shock absorber serves firstly to tilt the undercarriage leg in order to deploy it or retract it as required, and secondly to absorb at least some of the energy that results from an emergency landing.

Such an actuator-shock absorber may include a low-pressure space that is used to perform the deployment/retraction function of the undercarriage leg, and a high-pressure space that is used to perform the shock absorber function that is to dissipate the energy of an emergency landing.

Arranging an anticrash undercarriage in a small space without giving rise to high levels of aerodynamic drag thus turns out to be complex.

Furthermore, it should be observed that during a crash, the undercarriage retracts into its housing. When the housing is an undercarriage well formed in the aircraft airframe, the undercarriage runs the risk of passing through the walls defining the housing and possibly penetrating into the aircraft cabin, for example.

Document EP 0 275 735 describes an actuator-shock absorber, and also an undercarriage fitted with such an actuator-shock absorber.

Contact means are arranged at the end of an undercarriage leg that is suitable for pivoting about a pivot axis parallel to the transverse axis of the aircraft and thus perpendicular to the anteroposterior plane of symmetry of said aircraft.

Furthermore, an actuator-shock absorber is hinged to said undercarriage leg, the actuator-shock absorber being substantially parallel to the elevation axis of the aircraft.

The function of the actuator-shock absorber is to retract the contact means into a streamlined fairing, and to enable energy to be absorbed during landing. That actuator-shock absorber thus runs the risk of penetrating in unwanted manner into the airframe in the event of an emergency landing.

Document FR 2 689 087 presents an undercarriage having an undercarriage leg, the undercarriage leg comprising a first element and a second element that are hinged to each other about a pivot axis.

A shock absorber is also arranged between the first and second elements.

In addition, the first element is provided with contact means while the second element is provided with an actuator-shock absorber suitable for causing the contact means to retract by pivoting about the pivot axis.

It should be observed that during a crash, the contact means return into the housing, with this movement of the contact means being identical both during a crash and during retraction.

Document FR 2 383 070 describes an undercarriage having an undercarriage leg carrying contact means via an axle and a bent lever, the undercarriage leg being hinged to an aircraft via a universal joint.

In addition, the undercarriage includes a shock absorber hinged via a first universal joint to the undercarriage leg and to the aircraft via a second universal joint.

Finally, the undercarriage includes a driving and bracing actuator as opposed to an actuator-shock absorber, which actuator is hinged to the aircraft via a first universal joint and to the undercarriage leg via a second universal joint.

In the event of a crash, and like document FR 2 689 087, the contact means return into the housing, with the movement of the contact means being identical both during a crash and during retraction.

Documents EP 1 721 827 and EP 1 714 870 are also known.

SUMMARY OF THE INVENTION

An object of the present invention is thus to propose an aircraft having at least one undercarriage capable of being retracted into a confined space and that generates little aerodynamic drag.

According to the invention, an undercarriage is provided with an undercarriage leg together with a shock absorber, the undercarriage also having an actuator-shock absorber for retracting the undercarriage leg into a housing in an aircraft and for deploying the undercarriage leg out from the housing prior to a landing, and also for performing an energy-absorption function during an emergency landing, the undercarriage leg comprising both a first element carrying contact means and a second element, the first and second elements being hinged to each other about a hinge axis in order to form a scissors linkage. Each element represents one of the branches of the scissors linkage formed by the undercarriage leg.

Reference may be made to the literature in order to obtain detailed descriptions of an actuator-shock absorber.

Furthermore, it should be observed that the shock absorber suffices during so-called "normal" landings, i.e. when landing with a speed of descent that is below a predetermined threshold. Under such circumstances, during such normal landings, the actuator-shock absorber is not stressed sufficiently for it to absorb the energy that results from the contact means impacting against the ground, e.g. a wheel impacting against the ground. In contrast, during an emergency landing that takes place at a speed of descent that is greater than or equal to the predetermined threshold, the actuator-shock absorber dissipates at least some of the energy that results from the impact of the contact means with the ground.

The undercarriage is remarkable in particular in that it includes pivot means enabling the undercarriage leg to pivot about a pivot direction, firstly, during a normal landing in a first direction in order to retract the undercarriage leg into the housing under drive from the actuator-shock absorber, and secondly, during an emergency landing in a second direction opposite to the first direction in order to move the undercarriage leg away from the housing while stressing the actuator-shock absorber.

It can be understood that "pivoting about the pivot means" is a simplified way of referring to pivoting of a member about the pivot direction of the pivot means.

Thus, the undercarriage may be arranged in a small space, and in particular in an undercarriage well, while at least limiting the risk of a member of the undercarriage intruding into the cabin of the aircraft.

The undercarriage may include one or more of the following additional characteristics.

For example, the pivot means may be secured to the shock absorber, the shock absorber being hinged to the actuator-shock absorber and to the undercarriage leg. It can be understood that the pivot means comprise a structure co-operating with a fastener member of an aircraft, e.g. using sliding means such as a smooth bearing optionally mounted on a ball joint, or indeed rolling means such as a ball bearing or the equivalent.

In another aspect, the shock absorber comprises a first portion and a second portion that are movable relative to each other, a rod sliding in a cylinder, for example, the first portion being hinged to the first element of the undercarriage leg, the second portion being secured to the pivot means and being hinged to the second element of the undercarriage leg and to the actuator-shock absorber.

Furthermore, the pivot means and in particular the pivot direction thereof may optionally present a first acute angle relative to the second portion in order to encourage the movements explained above.

Furthermore, the actuator-shock absorber may present a second acute angle relative to an elevation plane containing the second element and the second portion.

In addition to an undercarriage, the invention also provides an aircraft, such as a rotorcraft, e.g. of the helicopter type, that is provided with the undercarriage.

According to the invention, an aircraft extends longitudinally along a longitudinal axis, transversely along a transverse axis, and in elevation along an elevation axis, the axes defining an orthogonal frame of reference, the aircraft including landing gear with at least one undercarriage provided with an undercarriage leg together with a shock absorber and an actuator-shock absorber, the actuator-shock absorber serving to retract the undercarriage leg into a housing of the aircraft and to deploy the undercarriage leg out from the housing prior to a landing, and also performing an energy-absorption function during an emergency landing occurring under predetermined conditions, the undercarriage leg comprising both a first element carrying contact means, and a second element, the first and second elements being hinged to each other in order to form a scissors linkage about a hinge axis.

The undercarriage includes pivot means enabling the undercarriage leg firstly to pivot in a first direction in order to retract the undercarriage leg into the housing under drive from the actuator-shock absorber, and secondly to pivot in a second direction opposite to the first direction during an emergency landing in order to move the undercarriage leg away from the housing while stressing the actuator-shock absorber.

The aircraft may include one or more of the following characteristics.

Thus, the pivot means and in particular the pivot direction of the pivot means present, in an aspect, a first acute angle relative to an anteroposterior plane of the aircraft defined by the elevation axis and the longitudinal axis of the aircraft, and a first acute angle relative to the shock absorber.

Furthermore, the shock absorber may be directed along an axis referred to as the "deployed axis" for convenience, which axis is parallel to the anteroposterior plane of the aircraft and it may present an acute angle relative to the elevation axis of the aircraft when the undercarriage is deployed after a takeoff or prior to a landing, independently of the type of landing, i.e. regardless of whether it is a normal landing or an emergency landing.

In another aspect, the pivot means are secured to the shock absorber, the shock absorber being hinged to the actuator-shock absorber and to the undercarriage leg.

Furthermore, the shock absorber may comprise a first portion and a second portion that are movable relative to each other, the first portion being hinged to the first element of the undercarriage leg, the second portion being secured to the pivot means and being hinged to the second element of the undercarriage leg and to the actuator-shock absorber.

Finally, the aircraft may have a fuselage that includes a lower section, with the lower section being a zone of the aircraft that is situated under the floor of the cabin of the aircraft, the housing being arranged at least in part in the lower section.

The invention also provides a method of landing under emergency conditions as implemented by an aircraft of the above-specified type.

According to the invention, there is provided a method of landing an aircraft that extends longitudinally along a longitudinal axis, transversely along a transverse axis, and in elevation along an elevation axis, the axes defining an orthogonal frame of reference, the aircraft including landing gear with at least one undercarriage provided with an undercarriage leg together with a shock absorber and an actuator-shock absorber, the actuator-shock absorber serving firstly, under normal conditions, to retract the undercarriage leg into a housing of the aircraft and to deploy the undercarriage leg out from the housing, and secondly, during an emergency landing, to perform an energy-absorption function, the undercarriage leg comprising both a first element carrying contact means and a second element, the first and second elements being hinged to each other about a hinge axis in order to form a scissors linkage, the undercarriage including pivot means about which the undercarriage leg pivots, which method is remarkable in that:

prior to the aircraft making contact with the ground, the undercarriage is deployed out from the housing by retracting the actuator-shock absorber into a first retracted position, the undercarriage leg needing to pivot about the pivot means in a first direction in order to return into the housing;

following contact of the contact means with the ground, the shock absorber is compressed, the angle between the first and second elements of the undercarriage leg being reduced so as to close the scissors linkage formed by said undercarriage leg; and when the shock absorber reaches a maximum compression level, the undercarriage leg is moved away from the housing by causing the undercarriage leg to pivot about the pivot means in a second direction opposite to the first direction.

The method may include one or more of the following characteristics.

For example, in order to move the undercarriage leg away from the housing, it is possible to apply the following steps:

use is made of the reaction force from the ground exerted on the contact means to develop a moment causing the undercarriage leg to pivot about the pivot means, i.e. about the pivot direction of the pivot means; and the undercarriage leg is caused to pivot in the second direction, thereby stressing the actuator-shock absorber, causing it to be retracted into a second retracted position, the actuator-shock absorber extending over a second length in the second retracted position that is shorter than a first length that it reaches in the first retracted position.

Furthermore, the actuator-shock absorber may be extended when the second retracted position has been reached.

BRIEF DESCRIPTION OF THE DRAWINGS

The invention and its advantages appear in greater detail from the following description of embodiments given by way of illustration with reference to the accompanying drawings, in which.

Elements that are present in more than one of the figures are given the same references in each of them.

DETAILED DESCRIPTION OF THE PREFERRED EMBODIMENTS

It should be observed in the figures that three mutually orthogonal directions X, Y, and Z define a frame of reference R for an aircraft of the invention.

The first direction is referred to as "longitudinal" and represents the longitudinal axis X of the aircraft shown.

A second direction is referred to as "transverse" and represents the transverse axis Y of the aircraft shown.

Finally, a third direction, said to be in "elevation", corresponds to the elevation Z of the aircraft shown.

Figure 1:
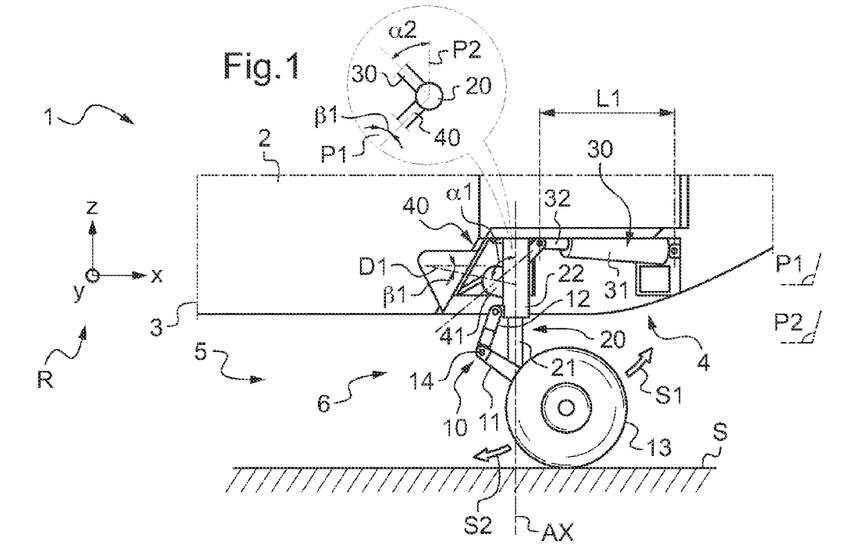
FIG. 1 is a side view showing an undercarriage of the invention extended from a housing in an aircraft.

FIG. 1 is a view of a side of an aircraft 1 of the invention.

The aircraft 1 comprises a fuselage 2 that extends longitudinally from a front end to a rear end along a longitudinal axis X. In addition, the fuselage extends laterally along a transverse axis Y and in elevation along an elevation axis Z. The plane defined by the longitudinal axis X and the elevation axis Z thus represents an anteroposterior plane P1 of symmetry of the aircraft 1.

The aircraft 1 includes landing gear 5 having at least one undercarriage 6 of the invention that is retractable in a housing 4 of the aircraft 1.

The undercarriage 6 is provided with contact means 13, an undercarriage leg 10, a shock absorber 20, and an actuator-shock absorber 30.

The ground contact means are carried by the undercarriage leg 10, the contact means 13 being provided with at least one wheel, for example.

Figure 8:
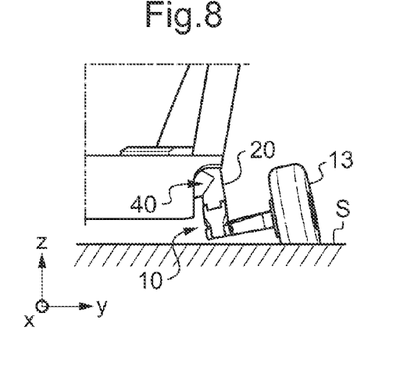

The undercarriage leg 10 is in the form of a scissors linkage. Thus, the undercarriage leg 10 has both a first element 11 carrying the contact means 13 and a second element 12, the first element 11 being hinged to the second element 12 about a hinge axis 14. The first element 11 and the second element 12 are therefore movable relative to each other, being capable of moving apart or towards each other in a pivoting movement about the hinge axis 14. The first element 11 and the second element 12 may also be contained in a common plane when the second element 12 overlies the first element 11. The first element 11 and the second element 12 may also be offset relative to each other, presenting a transverse offset, as shown in FIG. 8, for example.

Furthermore, the undercarriage includes a shock absorber 20 interconnecting in particular the first element 11 of the undercarriage leg 10 and the second element 12 of said undercarriage leg 10. For example, the shock absorber has a first portion 21 hinged via conventional hinge means to the first element 11 and a second portion 22 hinged via conventional hinge means to the second element 12, the first portion 21 and the second portion 22 being movable relative to each other to enable the shock absorber to be lengthened or shortened. Thus, the first portion 21 may be a rod sliding inside a cylinder representing the second portion 22.

Furthermore, the undercarriage 6 includes an actuator-shock absorber 30 hinged to the second portion 22 of the shock absorber via conventional hinge means, a ball joint co-operating with two cheeks secured to the second portion, or a universal joint, for example.

The actuator-shock absorber 30 may be of the type described in document FR 2 689 087, serving firstly to enable the contact means 13 to be deployed out from a housing 4 or retracted into the housing 4, and secondly, in the event of an emergency landing, to absorb energy above a predetermined threshold. For example, the actuator-shock absorber 30 may include a compression chamber and a retraction chamber for deploying or retracting the undercarriage, together with at least one high-pressure chamber that is involved solely during a said emergency landing.

Alternatively, the actuator-shock absorber 30 may include a compression chamber and a retraction chamber for deploying or retracting the undercarriage, together with one or more valves that open at a predefined pressure level corresponding to crash conditions, and that serve to put the above-mentioned compression chamber and retraction chamber into communication in order to absorb energy by throttling the hydraulic liquid of the shock absorber as it passes through orifices that are opened by the valves.

A first portion 31 is then fastened inside a housing 4 of an aircraft, while a second portion 32 of the actuator-shock absorber 30 is fastened to the shock absorber 20, the first portion 31 being movable relative to the second portion 32 in order to lengthen or shorten the actuator-shock absorber 30.

In addition to the actuator-shock absorber 30, the undercarriage 6 includes pivot means 40 for connecting to the inside of the housing 4.

For example, the pivot means may comprise a cylinder 41 secured to the shock absorber 20 and extending along a pivot direction D1, the cylinder co-operating with a pivot axis that is stationary relative to the housing 4 by using ball or roller bearing type means or by using a smooth bearing optionally mounted in a ball joint, for example. The pivot means are then secured to the shock absorber 20.

The shock absorber 20 is thus hinged to the undercarriage leg 10 and to the actuator-shock absorber 30, and is also secured to a member that is movable in pivoting of pivot means 40 such as a cylinder, for example.

In addition, it should be observed that the pivot means 40 and in particular its pivot direction D1 present a first acute angle $\alpha 1$ relative to the second portion 22 of the shock absorber 20.

Furthermore, it should be observed that the pivot means 40 and in particular its pivot direction D1 present a first acute angle $\beta 1$ relative to the anteroposterior plane of symmetry P1 of the aircraft.

The shock absorber 20 is also directed along a deployed axis AX parallel to the anteroposterior plane of the aircraft, and is capable of presenting an acute angle relative to the elevation axis Z of the aircraft 1 when the undercarriage 6 is deployed.

It should be observed that independently of the position of the shock absorber 20 and of the undercarriage leg 10, the actuator-shock absorber 30 presents a second acute angle $\alpha 2$ relative to an elevation plane P2 containing the second element 12 of the undercarriage leg 10 and the second portion 22 of the shock absorber 20.

Starting from the deployed position shown in FIG. 1, the undercarriage leg 10 under drive from the actuator-shock absorber then pivots about the pivot direction of the pivot means 40 in a first direction S1 in order to be retracted in flight. Conversely, during an emergency landing, the undercarriage leg 10, under the effect of the downward speed of the aircraft 1 and of the contact means 13 encountering the ground, pivots about the pivot direction of the pivot means 40 in a second direction S2 opposite to the first direction S1 in order to move away from the housing 4, and while involving the energy absorption function of the actuator-shock absorber 30.

Figure 2:
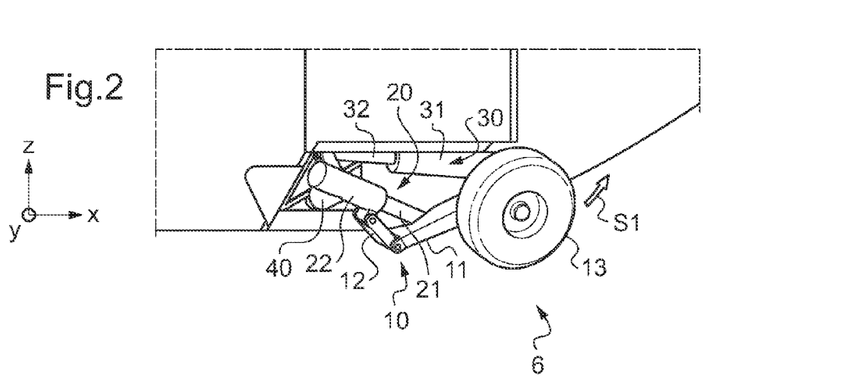
FIGS. 2 and 3 are a side view and a front view showing an undercarriage of the invention retracted into a housing in an aircraft.

FIG. 2 is a side view of an undercarriage 6 retracted into a housing 4. In this position, the actuator-shock absorber 30 is extended, extending over an extended length L0.

The fuselage 2 includes a lower section 3, and the housing 4 may be arranged at least in part in said lower section 3.

Figure 3:
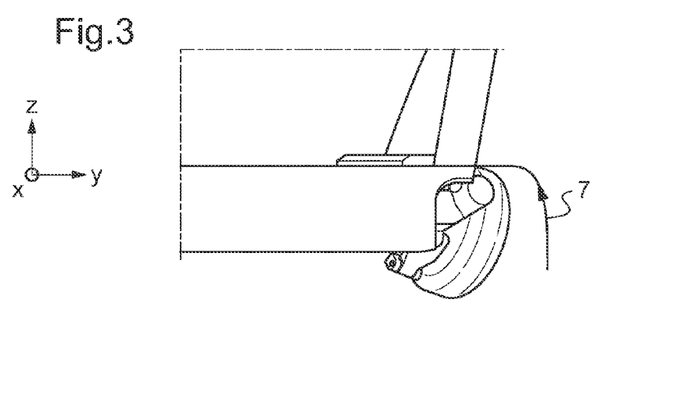

With reference to FIG. 3, the housing 4 may be contained in part in the lower section 3, the lower section co-operating with a fairing 7 to define said housing. It should be observed that the particular construction of the invention makes it possible to minimize the dimensions of the fairing.

Nevertheless, it can be understood that the lower section may contain the entire undercarriage without any such fairing being added, the size of the undercarriage being minimized.

Whether or not an external fairing of small dimension is added depends ultimately on the amount of space that can be made available in the lower section for receiving the undercarriage.

Figure 4:
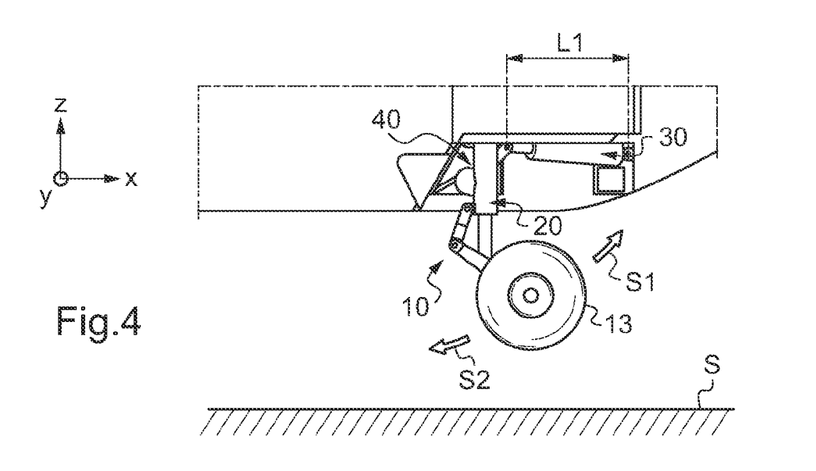
FIGS. 4 to 12 are views for explaining the method of the invention.

With reference to FIG. 4, prior to the aircraft 1 making contact with the ground S, the undercarriage 6 is deployed out from the housing 4 by retracting the actuator-shock absorber 30 into a first retracted position over a first length L1. The undercarriage leg 10 then pivots in a second direction S2, said undercarriage leg needing, conversely, to pivot about the pivot means 40 in a first direction S1 in order to return into the housing 4.

Figure 5:
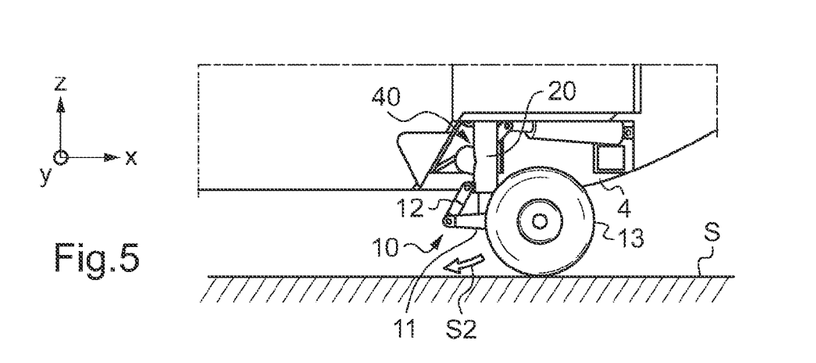

With reference to FIG. 5, after the contact means 13 have made contact with the ground S, the shock absorber 20 is compressed by shortenings. The scissors linkage of the undercarriage leg 10 closes, with the first element 11 moving closer to the second element 12.

When the landing is a normal landing, the undercarriage remains in an equilibrium position of the type shown in FIG. 5.

In contrast, in the event of an emergency landing occurring with a downward speed greater than or equal to a predetermined threshold, when the shock absorber 20 reaches a maximum level of compression, the undercarriage leg 10 is moved away from the housing 4 by the undercarriage leg 10 pivoting about the pivot means 40 in the second direction S2.

Figure 6:
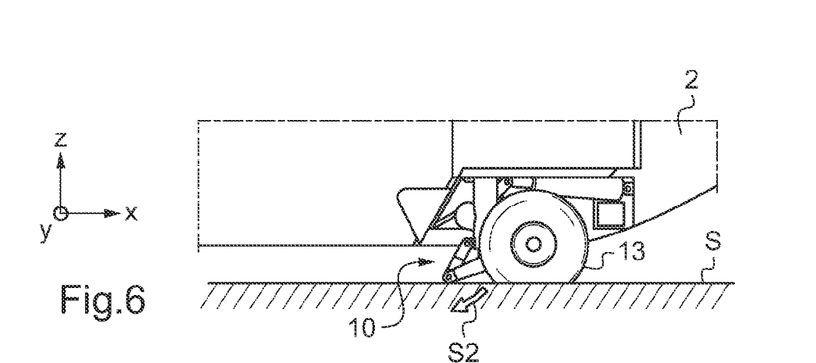
Figure 7:
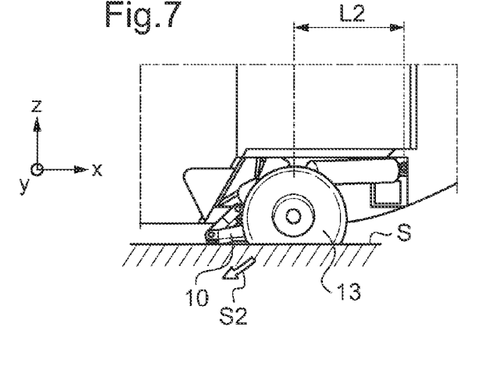

More precisely, with reference to FIGS. 6, 7, and 8, the reaction of the ground S on the wheel of the contact means serves to move the undercarriage leg 10 away from the housing 4. Starting from a predetermined instant, e.g. corresponding to the moment when the first element reaches the ground, use is made of the reaction of the ground S against the wheel of the contact means to establish a moment about the pivot direction D1 so as to cause the undercarriage leg 10 to pivot about this pivot direction, in the second direction S2, thereby stressing the actuator-shock absorber 30.

With reference to FIGS. 7 and 8, the reaction of the ground S against the undercarriage develops a moment about the pivot direction D1. This moment causes the undercarriage leg 10 to pivot about the pivot means, i.e. about the pivot direction in the second direction S2 while stressing the actuator-shock absorber 30.

Instead of causing the undercarriage to be retracted into the housing 4, the invention thus provides for the undercarriage to be moved away from said housing.

The pivoting movement of the undercarriage leg 10 and of the shock absorber 20 in the second direction S2 causes the actuator-shock absorber 30 to be retracted into a second retracted position, the actuator-shock absorber 30 extending over a second length L2 in the second retracted position that is shorter than the first length L1 that it reaches in the first retracted position.

Figure 9:
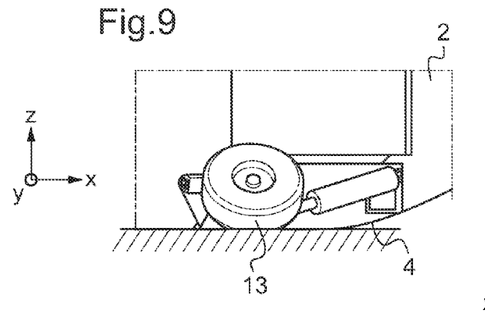
Figure 10:
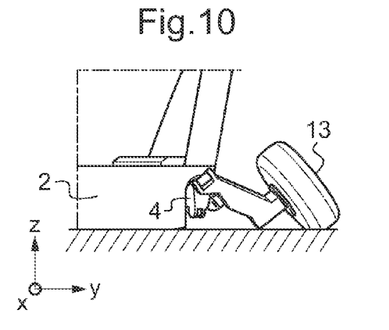

With reference to FIGS. 9 and 10, when the fuselage 2 of the aircraft 1 touches the ground S, the actuator-shock absorber 30 is extended.

When the actuator-shock absorber has reached the second retracted position, the fuselage 2 of the aircraft 1 comes into contact with the ground S. The actuator-shock absorber 30 is no longer subjected to compression and it extends, continuing to move the contact means 13 away from the housing 4.

Figure 11:
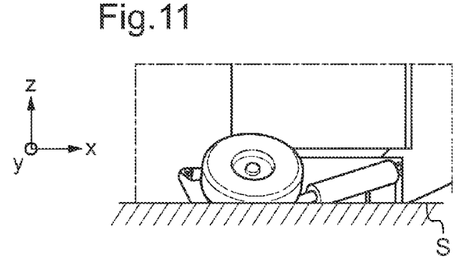
Figure 12:
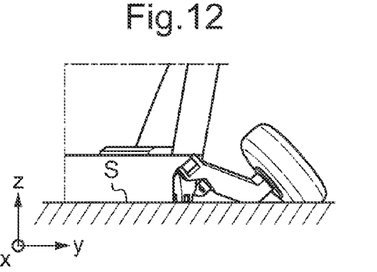

With reference to FIGS. 11 and 12, the bottom of the lower section deforms on coming into contact with the ground. It should be observed that the undercarriage 6 nevertheless continues to be useful during this stage of the landing. Specifically, by being moved away from the housing 4, the undercarriage performs a function of supporting the fuselage laterally, thereby tending to prevent the fuselage from tipping over onto one side, for example.

Naturally, the present invention may be subjected to numerous variations as to its implementation. Although several embodiments are described, it will readily be understood that it is not conceivable to identify exhaustively all possible embodiments. It is naturally possible to replace any of the means described by equivalent means without going beyond the ambit of the present invention.

What is claimed is:

1. An undercarriage comprising:
   an undercarriage leg including a first shock absorber being movable between a deployed position for landing and a retracted position where the undercarriage leg is retracted into a housing of an aircraft, the undercarriage leg including a first element hinged to a second element to define a scissor linkage;
   a wheel carried by the first element of the scissor linkage;
   a second actuator-shock absorber hinged to the first shock absorber and configured to be actuated retracting and deploying the undercarriage leg, and also for performing an energy-absorption function during an emergency landing; and
   a pivot means including a sole cylinder secured to the first shock absorber and the housing, wherein the undercarriage leg pivots in first and second pivot directions about the pivot means when the sole cylinder is extended and retracted to pivot the undercarriage leg in the first and second pivot directions, wherein the first and second pivot directions are oriented at an acute angle relative to a longitudinal axis of the aircraft,
   wherein from the deployed position, the undercarriage leg is moved to the retracted position into the housing by extending the second actuator-shock absorber and retracting the sole cylinder in so that the undercarriage leg pivots inward and rearward at the acute angle about the pivot means in the first pivot direction to the retracted position, and
   wherein, during the emergency landing, while the second actuator-shock absorber is in a retracted position, the sole cylinder extends in the second pivot direction opposite to the first pivot direction in order to move the undercarriage leg away from the housing at the acute angle in the second pivot direction.

2. The undercarriage according to claim 1, wherein the first shock absorber comprises a first portion and a second portion that are movable relative to each other, the first portion being hinged to the first element of the undercarriage leg, the second portion being secured to the pivot means and being hinged to the second element of the undercarriage leg and to the second actuator-shock absorber.

3. The undercarriage according to claim 2, wherein the pivot means present a first acute angle relative to the second portion.

4. The undercarriage according to claim 2, wherein the second actuator-shock absorber presents a second acute angle relative to an elevation plane containing the second element and the second portion.

5. An aircraft extending longitudinally along a longitudinal axis, transversely along a transverse axis, and in elevation along an elevation axis, the aircraft comprising:
   landing gear with at least one undercarriage provided with an undercarriage leg together having a first shock absorber connecting a scissor linkage defined by a first element hinged to a second element, the undercarriage being movable between a deployed position for landing and a retracted position where the undercarriage is retracted into a housing of the aircraft;
   a wheel carried by the first element of the scissor linkage;
   a second actuator-shock absorber configured to be actuated for moving the undercarriage leg, wherein the second shock absorber is actuated to an extended position to retract the undercarriage leg into a housing of the aircraft and the second actuator-shock absorber is actuated to a retracted position to deploy the undercarriage leg out from the housing prior to a landing, and also performing an energy-absorption function during an emergency landing; and
   pivot means including a sole cylinder secured to the first shock absorber and housing, wherein the undercarriage leg pivots in first and second pivot directions about the pivot means when the sole cylinder is extended and retracted, wherein the first and second pivot directions are oriented at an acute angle relative to the longitudinal axis of the aircraft
   wherein, from a deployed position, the undercarriage leg retracts into the housing under as the second actuator-shock absorber extends and the sole cylinder retracts in the first pivot direction so that the undercarriage leg pivots inward and rearward at the acute angle about the pivot means, and
   wherein, the undercarriage leg pivots in the second direction opposite to the first direction during the emergency landing, the undercarriage leg moves away from the housing direction.

6. The aircraft according to claim 5, wherein the pivot means present a first acute angle relative to an anteroposterior plane of the aircraft defined by the elevation axis and the longitudinal axis of the aircraft, and a first acute angle relative to the first shock absorber.

7. The aircraft according to claim 5, wherein the first shock absorber extends along the deployed axis when the undercarriage is deployed, the deployed axis being parallel to an anteroposterior plane of the aircraft as defined by the elevation axis and the longitudinal axis of the aircraft.

8. The aircraft according to claim 5, wherein the pivot means are directly secured to the first shock absorber, the first shock absorber being hinged to the second actuator-shock absorber and to the undercarriage leg.

9. The aircraft according to claim 5, wherein the first shock absorber comprises a first portion and a second portion that are movable relative to each other, the first portion being hinged to the first element of the undercarriage leg, the second portion being secured to the pivot means and being hinged to the second element of the undercarriage leg and to the second actuator-shock absorber.

10. An aircraft landing gear comprising:
    an undercarriage leg having a scissor linkage defined by a first element hinged to a second element and having a wheel carried by the first element of the scissor linkage, the undercarriage leg including a first shock absorber interconnecting the first element and the second element of the scissor linkage, wherein the undercarriage leg is movable between a deployed position for landing and a first retracted position where the undercarriage is retracted into a housing of an aircraft, and a second retracted position during an emergency landing;
    a second shock absorber hinged to the first shock absorber and connected to a landing gear housing in the aircraft, the second shock absorber configured to be actuated for moving the undercarriage leg such that when second shock absorber is extended, the undercarriage leg is retracted into the housing, and when the second shock absorber is retracted the undercarriage leg is deployed from the housing prior to the aircraft landing; and
    a pivot element connected between the housing and the first shock absorber, the pivot element configured to pivot the undercarriage leg about the pivot element when the pivot element moves in first and second pivot directions, wherein, from the deployed position the pivot element pivots the undercarriage leg inward and rearward in the first pivot direction to retract the undercarriage leg into the housing as the second shock absorber is retracted, and wherein during an emergency landing, when the first shock absorber reaches a maximum level of compression, the pivot element pivots the undercarriage leg in the second pivot direction opposite to the first pivot direction in order to move the undercarriage leg away from the housing in a generally transverse direction.

11. The landing gear according to claim 10, wherein the first shock absorber comprises a first portion and a second portion that are movable relative to each other, the first portion being hinged to the first element of the undercarriage leg, the second portion being secured to the pivot element and being hinged to both the second element of the undercarriage leg and to the second shock absorber.

12. The landing gear according to claim 10, wherein during the emergency landing, when the undercarriage leg pivots in the second pivot direction, the second shock absorber moves to a second retracted position being shorter than a first retracted position.

13. The landing gear according to claim 11 wherein a reaction force above a threshold level from the ground exerted on the undercarriage leg develops a moment causing the undercarriage leg to pivot by the pivot element.

14. The undercarriage according to claim 1, wherein during the emergency landing, when the undercarriage leg pivots in the second pivot direction, the second actuator-shock absorber moves to a second retracted position being shorter than a first retracted position.

15. The undercarriage according to claim 1 wherein the undercarriage leg is moved away from the housing when the first shock absorber reaches a maximum compression level.

16. The undercarriage according to claim 1 wherein a reaction force above a threshold level from the ground exerted on the undercarriage leg develops a moment causing the undercarriage leg to pivot about the pivot means.

17. The aircraft according to claim 5 wherein during the emergency landing, when the undercarriage leg pivots in the second pivot direction, the second actuator-shock absorber moves to a second retracted position being shorter than a first retracted position.

18. The undercarriage according to claim 5 wherein the undercarriage leg is moved away from the housing when the first shock absorber reaches a maximum compression level.

19. The landing gear according to claim 11 wherein the a pivot element includes a sole cylinder secured to the first shock absorber enabling the undercarriage leg to pivot in first and second pivot directions from the deployed position when the cylinder is extended and retracted in the first and second pivot directions, wherein the first and second pivot directions are oriented at an acute angle relative to a longitudinal axis of the aircraft.

20. The undercarriage according to claim 2, wherein the sole cylinder is directly secured to the first shock absorber along the second portion so that the first shock absorber pivots at the acute angle.

* * * * *